March 17, 1959  N. J. LIAAEN  2,877,743
SERVOMOTOR CONTROL SYSTEM
Filed Dec. 17, 1956  2 Sheets-Sheet 1
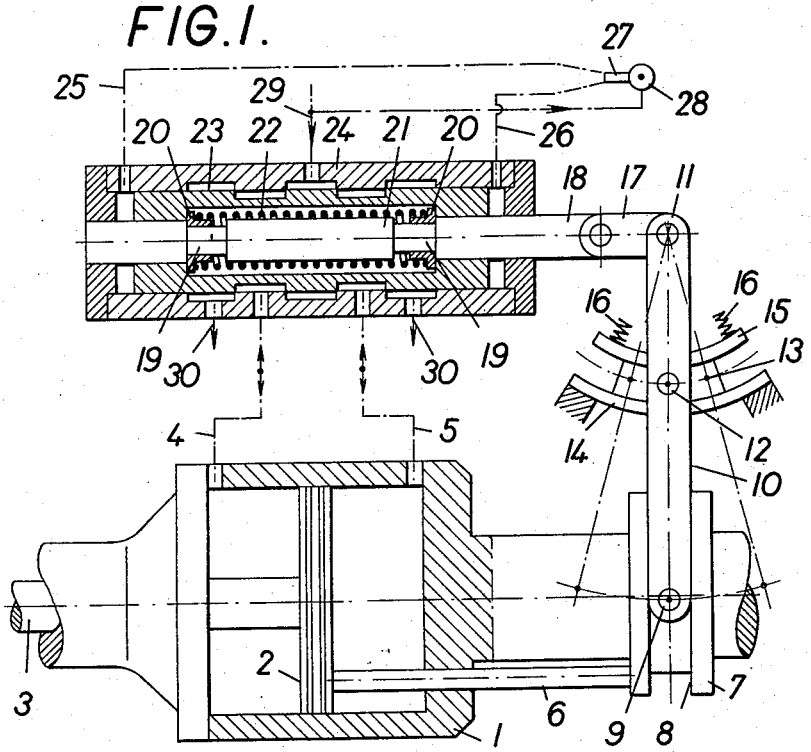
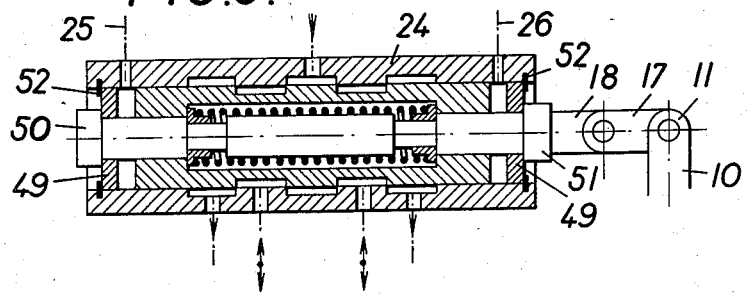
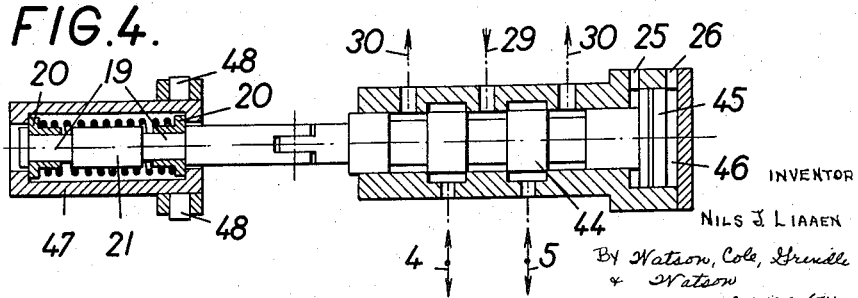
INVENTOR
NILS J. LIAAEN
By Watson, Cole, Grindle & Watson
ATTORNEYS March 17, 1959  N. J. LIAAEN  2,877,743
SERVOMOTOR CONTROL SYSTEM
Filed Dec. 17, 1956  2 Sheets-Sheet 2

INVENTOR
NILS J. LIAAEN

By Watson, Cole, Grindle & Watson
ATTORNEYS

United States Patent Office 2,877,743
Patented Mar. 17, 1959

2,877,743

SERVOMOTOR CONTROL SYSTEM

Nils J. Liaaen, Alesund, Norway

Application December 17, 1956, Serial No. 628,925

2 Claims. (Cl. 121—41)

The present invention relates to a servomotor control system of the type wherein a hydraulically actuated piston is supplied with pressure oil under the control of a valve which is hydraulically or electromagnetically actuated in dependence upon a manual or automatic pulse generator. The valve is subjected to the influence of a spring which returns the same to middle position when the pulse ceases, but is otherwise freely movable, without any mechanical connection with the servomotor.

Leakage is usually unavoidable in the servomotor cylinder or in the conduits, with the result that the piston yields to the force to which it is subjected and starts to sag. In order to counteract the sag of the piston it is known to provide an additional valve which is influenced by the movement of the piston.

It is the object of the present invention to use the hydraulically actuated valve also for the compensation purpose mentioned, and an essential feature of the invention therefore resides in that the valve in addition to the actuation derived from the pulse generator may also be under the control of the servomotor piston through a mechanical resetting device.

Further characteristic features of the invention are to be described in the following description with reference to the accompanying diagrammatic drawing.

Figure 1 is a longitudinal section of the servo-motor cylinder and the connection between the servo-motor piston and the valve member;

Figure 4 is a sectional view of another embodiment; and

Figure 5 is a sectional view of a further embodiment.

Figure 3:
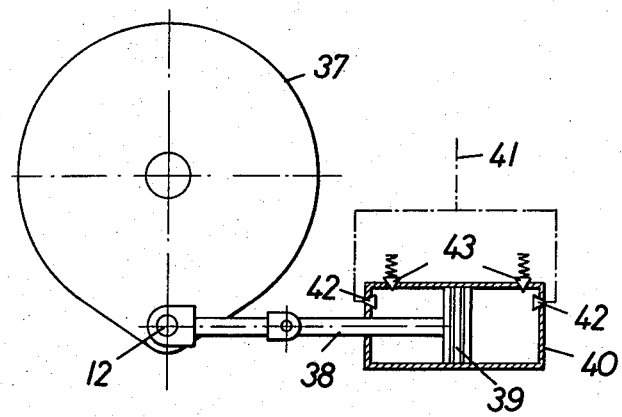
Figure 3 is a view, partly in section, of another embodiment of the arrangement according to Figure 2.

In Figure 1, 1 is the servomotor cylinder, 2 the piston and 3 the piston rod. The cylinder is, by way of example, shown as combined with the shaft of a controllable pitch propeller, and the piston rod 3, which is carried through the hollow shaft serves to adjust the pitch of the propeller blades.

The servomotor cylinder is provided with conduits for the supply of oil under pressure through the connections 4 and 5 which alternatively serve as pressure oil feeder and drain conduits. Further, the piston is connected with a ring 7 through a rod 6 which is slidably supported on the shaft, the ring being provided with a groove 8 which is engaged by a pin 9 carried by a lever 10 which is pivoted on a pin 11. At a certain distance from the pivot 11, the lever is provided with a pin 12 which engages a block 13 which is movable in a guide formed by two plates 14 and 15 formed as an arc of a circle, the latter plate 15 being urged against the block by springs 16 of adjustable force. Thus, the block 13 can only be moved against the friction resistance applied.

At the top end, the lever 10 is, through a link 17, connected to a rod 18 which is formed with two recessed portions 19 situated to either side of the middle portion 21 and each accommodating a bush 20 which is urged against a shoulder of the recessed portion by means of a spring 22. Otherwise the rod 18 is freely movable through the valve and the valve housing 23 and 24, respectively. The valve housing is provided with passages for the feeding of oil through the conduits 25 and 26 which are cooperating with a nozzle 27 which is pivotable about an axis 28 and which may be brought into alignment with either of the conduits. Oil is constantly pumped through the nozzle 27, and when the operational condition is to be changed, the pulse is transmitted to the nozzle which is turned from a middle position into alignment with either of the conduits 25 or 26. These conduits are permanently filled with oil, and as soon as the oil jet is directed against the mouth of the conduit, a pressure increase is effected on the pertinent end face of the valve which is thereby caused to move to its end position in abutment against the bottom of the valve housing. Thereby the valve opens the passage receiving oil from the conduit 29 and that of the passages which is carrying oil to the servomotor cylinder through one of the conduits 4 or 5.

The movement of the valve is performed against the action of the spring 22 which also tends to transmit the movement of the valve in either direction to the rod 18, but as the lever 10 is not able to turn about the pin 9 due to the shape of the guide and also due to the friction resistance in the guide, the rod 18 is maintained at rest. The force applied by the spring against the rod is also rather small. In order to save the rod from being subjected to the pressure applied to the end face of the valve, the length of the bushes 20 is so adjusted relatively to the length of the recessed portions 19 that the clearance available for free movement of the bushes corresponds to the clearance between the end faces of the valve and the bottom of the valve housing. Consequently it is only the force of the spring 22 which may be transmitted to the rod 18 during the movement of the valve, but as soon as the valve has arrived in the end position, the rod is kept locked by the valve, as the bush 20 is then abutting against both the valve and the shoulder of the rod against which it has abutted.

The movement of the valve from the middle position to the end position is performed during the least possible space of time, and the passages associated with the conduits 29, 4 and 5 are thereafter fully open for supply of pressure oil to the servomotor. During the movement of the piston, the ring 7 is also brought along and the lever 10 is thereby turned about the pin 9 and brings along the guide block, the resistance against the movement of the rod 18 being greater than the resistance against the movement of the block. Thus, the pin 11 is maintained at rest. When the pulse ceases the nozzle 27 is returned to its middle position, and simultaneously therewith the spring 22 returns the valve to its middle position.

If now the piston commences to sag, the lever 10 is turned about the pin 12, while the block 13 is maintained at rest due to the small resistance offered to the movement of the valve. The passages supplying pressure oil to the servomotor are consequently reopened and the piston is returned to the initial position at the same time as the valve, in the manner of an ordinary return device, is brought back to middle position and re-closes the passages.

Figure 2:
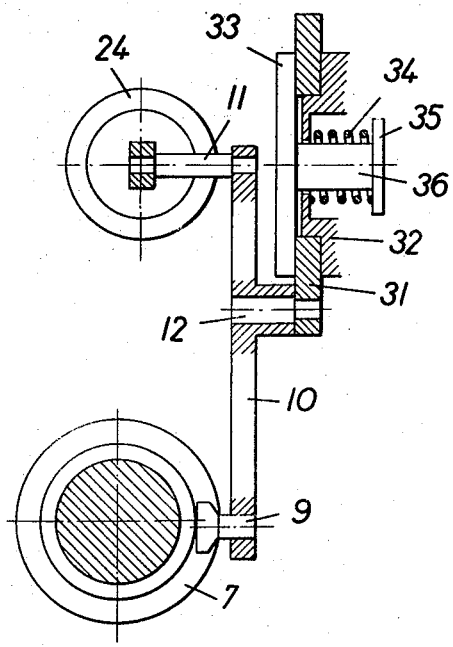
Figure 2 is a view, partly in section, of an embodiment of the connection between the servo-motor piston and the valve member.

Figure 2, which is a side view of the lever 10, the ring 7 and the pin 11, illustrates another embodiment of the braking arrangement in connection with the pin 12, which is here in engagement with a disc 31 which is rotatably mounted in a stationary member 32, the disc being formed as a ring which is mounted on the recessed portion. The disc is urged against the stationary member by a plate 33 by means of a spring 34 which abuts against the flange 35 of a short shaft 36 connected to the plate 33.

As apparent from the figure, the axis of the disc 31 is coincident with the axis of the pin 11, to the effect that seizing is excluded.

Figure 3 shows an arrangement for the provision of resistance against the movement of the pin 12. In this case also, use is made of a rotatable disc which is designated 37 in which the pin 12 is secured, but the resistance against rotation of the disc is based upon throttle braking. A rod 38 is hingely connected to the pin 12 and forms the piston rod of the piston 39 of a cylinder 40 which is filled with oil or any other liquid through a supply conduit 41 which through branches enters the end walls of the cylinder in which nonreturn valves 42 are arranged. The draining from the cylinder is effected through spring loaded valves 43, which determine the resistance against the movement of the piston. In both the two arrangements shown in the Figures 2 and 3, the adjustment of the spring force may be effected in any suitable manner.

Figure 4 shows one further embodiment of the valve and the carrier arrangement, the latter being in the form of a separate unit. The rod 18 having recessed portions 19 and bushes 20 as well as spring 22, is similar to that shown in Figure 1, but is here arranged in a housing 47 provided with pins 48 supported in a forked end of the rod 10, or connected with the same in any suitable manner. The valve, which is here designated 44, differs from that shown in Figure 1 in that it is provided with a piston 45 of greater diameter than the valve and movable in a cylinder 46 having passages 25 and 26 for the supply of pressure oil and the valve housing proper is also provided with passages in accordance with the arrangement shown in Figure 1.

In the arrangement shown, the diameter of the valve may be kept small and consequently of small mass, without thereby influencing the actuating force which is determined by the diameter of the piston 45. Otherwise, the function is completely the same as that of the arrangement shown in Figure 1.

Figure 5 illustrates a modification of the valve arrangement according to Figure 1, consisting in that the interior of the valve housing is defined by loose discs each engaging a shoulder on the slide rod and also engaging an abutment on the wall of the valve housing. The discs consequently are movable both in relation to the valve rod and in relation to the valve housing. The discs are shown at 49, and are engaging a head 50 and a portion 51 of increased diameter, respectively, of the rod 18. Further, the discs 49 engage stops 52 in the form of spanner rings accommodating in the wall or the valve housing.

In this arrangement, the rod 18 and thereby also the rod 10 are fully relieved of the force applied by the valve through the spring 22 to the rod when the liquid pressure is applied, and the tendency of the lever 10 which would otherwise have been present, to turn about the lower pivot is consequently eliminated, the pressure against the valve being compensated by an equal and oppositely directed pressure against the end of the rod.

I claim:

1. A servo-motor control system comprising a cylinder accommodating a movable piston and a pressure liquid supply system including valve means, said valve means including a movable valve member mounted on a movable slide rod, a resilient connection means between said valve member and said slide rod and a mechanical resetting mechanism between said slide rod and said piston, comprising a lever member, a pivot for said lever member at a point intermediate the ends of said lever member, a support for said pivot and brake means acting upon said lever member, and including a first brake shoe member hingedly connected to the pivot of the said lever member, a pivot supporting the said first brake shoe member, a second brake shoe member adapted to engage the said first brake shoe member and spring means adapted to urge the second brake shoe member into engagement with the said first brake shoe member.

2. A servo-member control system comprising a cylinder accommodating a movable piston and a pressure liquid supply system including valve means, said valve means including a movable valve member mounted on a movable slide rod, a resilient connection means between said valve member and said slide rod and a mechanical resetting mechanism between said slide rod and said piston, comprising a lever member, a pivot for said lever member at a point intermediate the ends of said lever member a support for said pivot and brake means acting upon said lever member, and including a disc-like member hingedly connected to the pivot of the said lever member, a pivot supporting the said disc-like member, a cylinder accommodating a movable piston, a pressure liquid supply system including non-return inlet valves and spring loaded outlet valves of the said cylinder, the piston being provided with a piston rod extending to and hingedly connected to the pivot of the said lever member.

References Cited in the file of this patent
UNITED STATES PATENTS

| | | |
|---|---|---|
| 2,139,981 | Sugihara | Dec. 13, 1938 |
| 2,486,816 | Beeh | Nov. 1, 1949 |

FOREIGN PATENTS

| | | |
|---|---|---|
| 75,327 | Austria | Jan. 25, 1919 |
| 378,672 | Italy | Feb. 21, 1940 |
| 146,887 | Australia | Feb. 2, 1950 |